United States Patent
Satake et al.

(10) Patent No.: US 9,457,766 B2
(45) Date of Patent: Oct. 4, 2016

(54) ELECTRONIC KEY SYSTEM

(71) Applicant: Yazaki Corporation, Tokyo (JP)

(72) Inventors: Shuuji Satake, Susono (JP); Akiyoshi Kanazawa, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/435,894

(22) PCT Filed: Oct. 23, 2013

(86) PCT No.: PCT/JP2013/078682
§ 371 (c)(1),
(2) Date: Apr. 15, 2015

(87) PCT Pub. No.: WO2014/065313
PCT Pub. Date: May 1, 2014

(65) Prior Publication Data
US 2015/0291128 A1    Oct. 15, 2015

(30) Foreign Application Priority Data
Oct. 25, 2012  (JP) ................................. 2012-235738

(51) Int. Cl.
G05B 19/00   (2006.01)
B60R 25/24   (2013.01)
B60R 25/34   (2013.01)
G07C 9/00    (2006.01)

(52) U.S. Cl.
CPC ............. B60R 25/241 (2013.01); B60R 25/34 (2013.01); G07C 9/00309 (2013.01); G07C 2009/00412 (2013.01)

(58) Field of Classification Search
CPC .................. B60R 25/241; G07C 2009/00412; G07C 9/00309
See application file for complete search history.

(56) References Cited

U.S. PATENT DOCUMENTS

| 5,641,998 | A | * | 6/1997 | Maeda | B60R 25/04 180/287 |
| 6,972,671 | B2 | * | 12/2005 | Normann | B60C 23/009 340/442 |
| 7,545,255 | B2 | * | 6/2009 | Ohtaki | H04B 13/005 340/5.23 |
| 2001/0009394 | A1 | | 7/2001 | Yanaka | |
| 2003/0085618 | A1 | * | 5/2003 | Rhodes | B60R 16/0207 307/10.1 |
| 2006/0017584 | A1 | * | 1/2006 | Yanagida | B60R 25/1004 340/652 |
| 2011/0119556 | A1 | * | 5/2011 | de Buen | H04L 41/12 714/758 |

FOREIGN PATENT DOCUMENTS

| JP | 2001-200666 A | 7/2001 |
| JP | 2004-027882 A | 1/2004 |
| JP | 2005-324712 A | 11/2005 |

OTHER PUBLICATIONS

International Search Report mailed Jan. 7, 2014, issued for PCT/JP2013/078682.

* cited by examiner

*Primary Examiner* — Omeed Alizada
(74) *Attorney, Agent, or Firm* — Locke Lord LLP

(57) ABSTRACT

An electronic key system enabling to improve security against vehicle theft is provided. A smart ECU acquires encrypted data from an electronic key. When all identification data stored in a memory and a memory of an electronic component embedding connector correspond to the identification data transmitted from the electronic key, the smart ECU cancels security and permits operations of a door lock driving unit, a steering lock driving unit, and an engine control unit.

2 Claims, 4 Drawing Sheets

ELECTRONIC KEY SYSTEM

TECHNICAL FIELD

The present invention relates to an electronic key system, and more specifically relates to an electronic key system in which operations of in-vehicle units such as an engine control unit are permitted when authorized identification data is transmitted from an electronic key to cause security to be canceled.

BACKGROUND ART

As the aforementioned electronic key system, an engine start control system described in Patent Literature 1 has been proposed, for example. In the engine start control system described in Patent Literature 1, ID codes (identification data) are prestored in memories in a smart ECU controlling a door lock mechanism and a plurality of immobilizer ECUs controlling an engine control unit to permit an engine to start when an ID code transmitted from an electronic key corresponds to all the ID codes prestored in the smart ECU and the plurality of immobilizer ECUs.

However, in the aforementioned conventional engine start control system, the ID codes are stored in the plurality of ECUs. Since installation locations of these ECUs in the vehicle are easily identified, and the ECUs are detached relatively easily, security is canceled in an unauthorized manner by replacement of the ECUs themselves. This causes a problem in which security against vehicle theft is incomplete.

CITATION LIST

Patent Literature

Patent Literature 1: JP 2004-27882 A

SUMMARY OF INVENTION

Technical Problem

An object of the present invention is to provide an electronic key system enabling to improve security against vehicle theft.

Solution to Problem

To solve the above problems, an invention described resides in an electronic key system including a control unit acquiring identification data from an electronic key and connected to a first in-vehicle unit whose operation is permitted when the acquired identification data is authorized, and security is canceled, a first wiring harness connected to the control unit, a second wiring harness connected to a second in-vehicle unit, and a connector connecting the first wiring harness to the second wiring harness. The control unit and the connector respectively have embedded therein memories prestoring identification data. The electronic key system further includes a security canceling unit canceling security when all the identification data stored in the memories embedded in the control unit and the connector correspond to the identification data transmitted from the electronic key.

Preferably, an invention described resides in the electronic key system, wherein the connector has embedded therein an attaching/detaching detecting unit detecting attaching and detaching of the control unit, and wherein, once the attaching/detaching detecting unit detects that the control unit has been detached, the security canceling unit does not perform security canceling thereafter.

Advantageous Effects of Invention

As described above, according to the invention, the identification data is stored in the connector connecting to each other the wiring harnesses connected to the control unit and the second in-vehicle unit. That is, by storing the identification data in the connector integrated into the wiring harnesses, which are attached to the vehicle body and are difficult to be detached since they cannot be detached without detaching other accessories, security canceling by means of part replacement is difficult, which enables security against vehicle theft to be improved.

According to the invention, the security canceling cannot be performed when the control unit is detached for an unauthorized purpose. Thus, security against vehicle theft can further be improved.

DESCRIPTION OF EMBODIMENTS

First Embodiment

Figure 1:
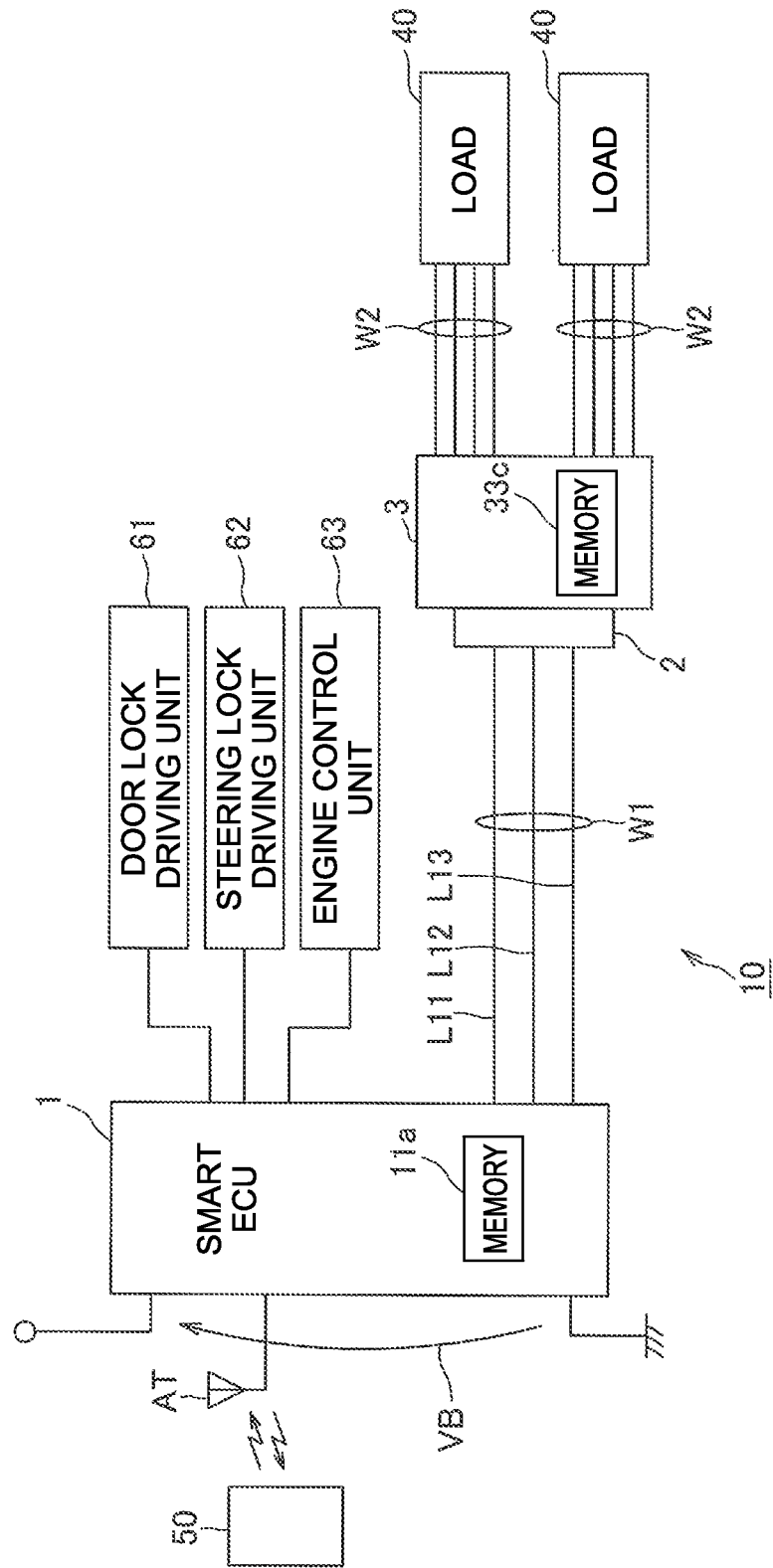
FIG. 1 is a block diagram illustrating an electronic key system according to the present invention.
Figure 2:
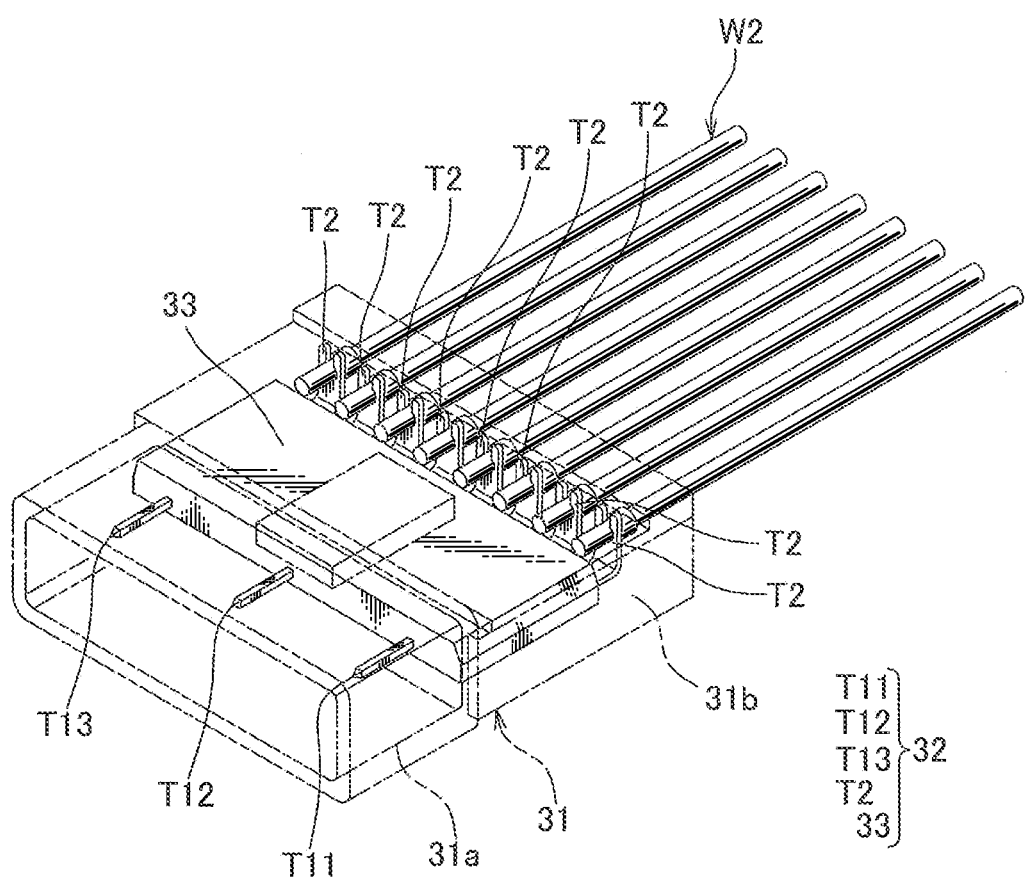
FIG. 2 is a detailed perspective view of an electronic component embedding connector illustrated in FIG. 1.
Figure 3:
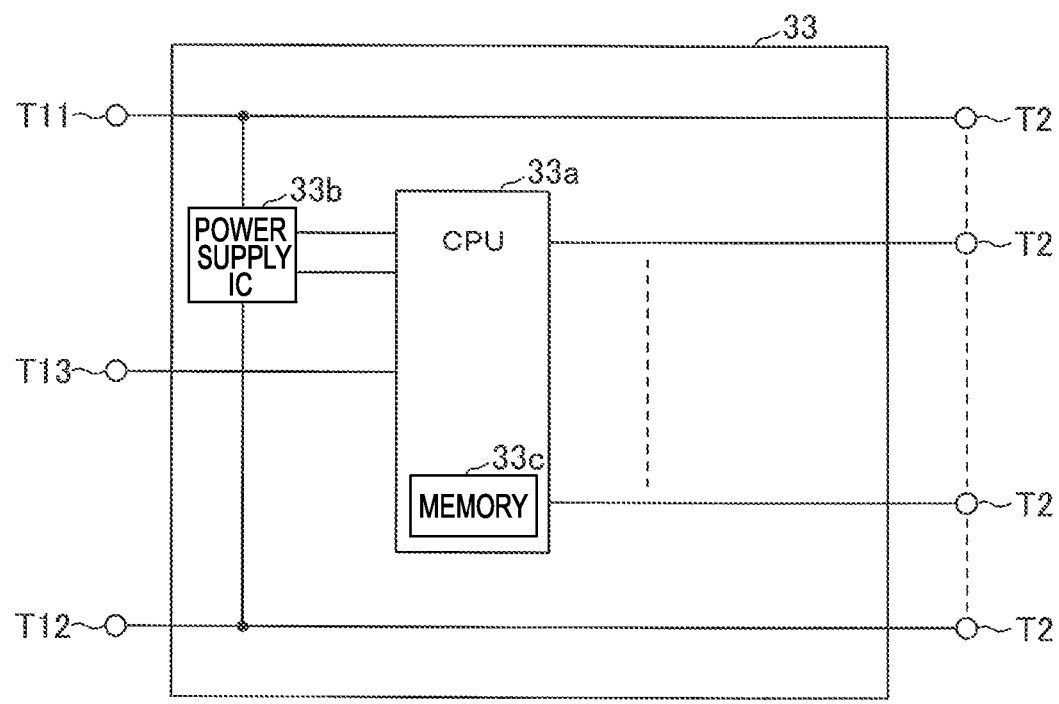
FIG. 3 is a circuit diagram of a control circuit sealed in a sealed body illustrated in FIG. 2.

Hereinbelow, an electronic key system according to a first embodiment of the present invention will be described based on FIGS. 1 to 3. FIG. 1 illustrates an electronic key system according to the present invention. FIG. 2 is a detailed perspective view of an electronic component embedding connector illustrated in FIG. 1. FIG. 3 is a circuit diagram of a control circuit sealed in a sealed body illustrated in FIG. 2.

An electronic key system 10 illustrated in FIG. 1 is mounted in a not-illustrated vehicle. This electronic key system 10 includes a smart ECU 1 as a control unit, a first wiring harness W1 connected to the smart ECU 1, second wiring harnesses W2 connected to a plurality of loads 40 (corresponding to "a second in-vehicle unit") controlled by the smart ECU 1, a connecting connector 2 attached to an end portion of the first wiring harness W1, and an electronic component embedding connector 3 (corresponding to "a connector") attached to end portions of the second wiring harnesses W2.

The smart ECU 1 is provided to enable wireless communication with a freely portable electronic key 50 via an antenna AT and receives encrypted data (corresponding to "identification data") transmitted from the electronic key 50. Also, to the smart ECU 1 are connected to a door lock driving unit 61, a steering lock driving unit 62, and an engine control unit 63 (corresponding to "a first in-vehicle unit") whose operations are permitted when authorized encrypted data is transmitted from the electronic key 50 to cause security to be canceled.

The door lock driving unit 61 is a unit which performs locking/unlocking of a not-illustrated door. The steering lock driving unit 62 is a unit which performs locking/unlocking of not-illustrated steering lock. The engine control unit 63 is a unit which controls fuel injection in a not-illustrated engine and engine ignition. Also, the smart ECU 1 has embedded therein a memory 11a storing part of the authorized encrypted data.

The smart ECU 1 is operated when it is supplied with power supply voltage VB from a not-illustrated battery. The smart ECU 1 outputs control signals configured to control the loads 40. This smart ECU 1 is provided with a power supply terminal from which positive side signals of the power supply voltage VB are output, a ground terminal from which negative side signals of the power supply voltage VB are output, and a control terminal from which the control signals are output (none of the terminals is illustrated).

The first wiring harness W1 includes a power supply line L11 connected to the power supply terminal of the smart ECU 1, a ground line L12 connected to the ground terminal, and a control line L13 connected to the control terminal and performing multiple (serial) transmission of the control signals to the respective loads 40. One end of this first wiring harness W1 is connected to the smart ECU while the other end is connected to the connecting connector 2.

Each of the second wiring harnesses W2 includes wires such as a power supply line and a ground line configured to supply the power supply voltage VB and a control line configured to output the control signals to the load 40. One end of the second wiring harness W2 is connected to each load 40 while the other end is connected to the electronic component embedding connector 3.

The electronic component embedding connector 3 is connected to the connecting connector 2 attached to the other end of the first wiring harness W1 to connect the first wiring harness W1 and each of the second wiring harnesses W2 to each other. The electronic component embedding connector 3 includes an outer housing 31 and a control circuit package 32 housed in the outer housing 31 as illustrated in FIG. 2. The outer housing 31 is formed in a flat box shape using an insulating synthetic resin and integrally includes a tubular hood portion 31a and a control circuit package housing chamber 31b leading to the hood portion 31a as illustrated in FIG. 2.

The control circuit package 32 includes a power supply terminal metal fitting T11, a ground terminal metal fitting T12, and a control terminal metal fitting T13 respectively connected to the power supply line L11, the ground line L12, and the control line L13 constituting the first wiring harness W1, a plurality of terminal metal fittings T2 respectively connected to the second wiring harnesses W2, and a sealed body 33 as illustrated in FIG. 2.

The power supply terminal metal fitting T11, the ground terminal metal fitting T12, and the control terminal metal fitting T13 are made of conductive metals. One end of each fitting is inserted in the below-mentioned sealed body 33 while the other end projects from one surface out of a pair of surfaces of the sealed body 33 opposed to each other. Also, the other ends of these terminal metal fittings T11, T12, and T13 projecting to the outside are provided with male tab terminals, which are housed in the hood portion 31a of the outer housing 31.

The male tab terminals formed in these terminal metal fittings T11, T12, and T13 are electrically connected to female terminal metal fittings (not illustrated) in the connecting connector 2 when the connecting connector 2 attached to terminals of the first wiring harness W1 is fitted with the male tab terminals. This causes the power supply line L11, the ground line L12, and the control line L13 constituting the first wiring harness W1 to be connected to the power supply terminal metal fitting T11, the ground terminal metal fitting T12, and the control terminal metal fitting T13, respectively.

Each of the terminal metal fittings T2 is made of a conductive metal. One end of each fitting is inserted in the below-mentioned sealed body 33 while the other end projects from the other surface out of the pair of surfaces of the sealed body 33 opposed to each other. Also, the other ends of these terminal metal fittings T2 projecting to the outside are provided with insulation displacement connectors, to which the wires constituting the second wiring harnesses W2 are pressure-connected.

The sealed body 33 resin-seals a not-illustrated chip having embedded therein the control circuit illustrated in FIG. 3 and one ends of these terminal metal fittings T11, T12, T13, and T2 in a state in which these are wire-bonded and connected. As illustrated in FIG. 3, in this sealed body 33, the power supply terminal metal fitting T11, the ground terminal metal fitting T12, and the terminal metal fittings T2 are connected one another to cause the power supply voltage VB to be supplied to the respective loads 40 as illustrated in FIG. 3. Also, the chip in the sealed body 33 includes a CPU 33a and a power supply IC 33b as illustrated in FIG. 3.

The CPU 33a is operated when it is supplied with power from the below-mentioned power supply IC 33b, identifies an address based on a control signal received from the control terminal T13, and transmits the control signal to the terminal metal fitting T2 to which the addressed load 40 is connected. The CPU 33a also has embedded therein a memory 33c storing part of the authorized encrypted data. That is, in the present embodiment, the first half of the authorized encrypted data is stored in the memory 11a in the smart ECU 1 while the last half is stored in the memory 33c in the electronic component embedding connector 3, for example. In other words, the authorized encrypted data is separated and stored in the memory 11a in the smart ECU 1 and the memory 33c in the electronic component embedding connector 3.

The power supply IC 33b is connected to the power supply terminal metal fitting T11 and the ground terminal metal fitting T12, generates power for the CPU 33a from the power supply voltage VB to be applied between the power supply terminal metal fitting T11 and the ground terminal metal fitting T12, and supplies it to the CPU 33a.

Figure 4:
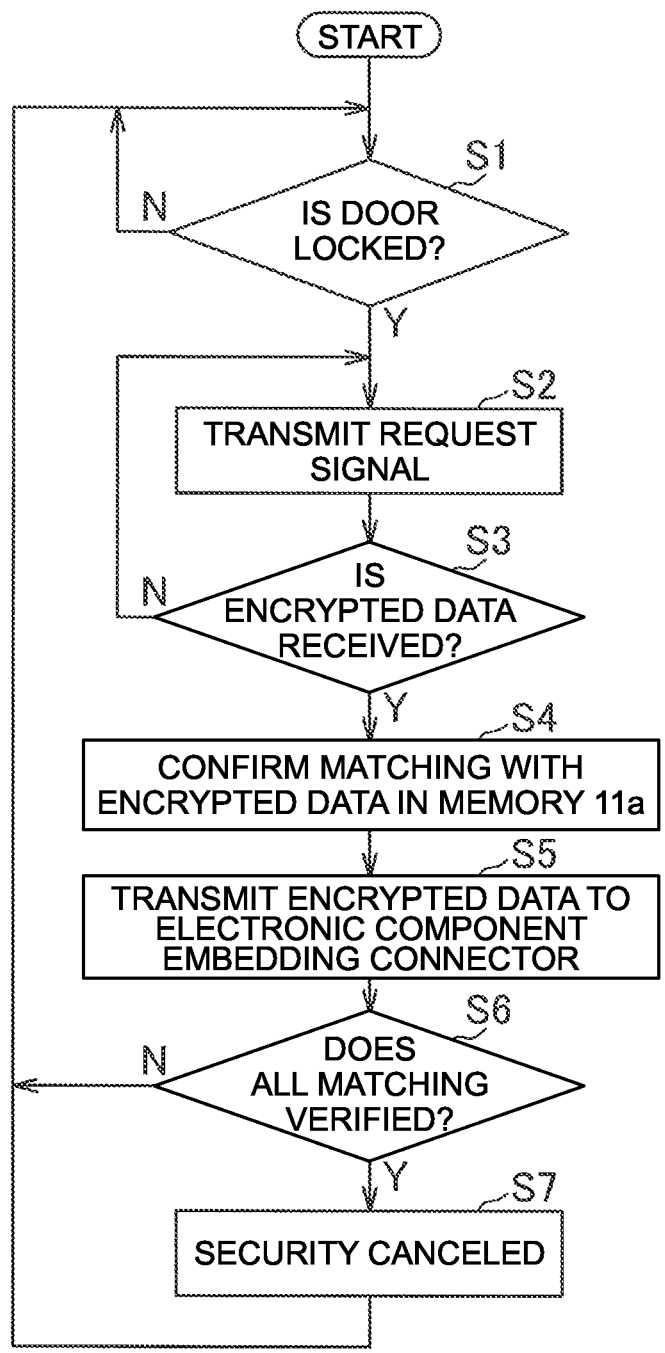
FIG. 4 is a flowchart illustrating a processing procedure of a smart ECU illustrated in FIG. 1.

Next, operations of the electronic key system 10 mentioned as above will be described with reference to a flowchart illustrated in FIG. 4. The smart ECU 1 is mounted in a vehicle and starts operations when it is supplied with power. First, the smart ECU 1 determines from a control history of the door lock driving unit 61 whether or not the door is locked (step S1). In a case in which the door is locked (Y in step S1), the smart ECU 1 intermittently transmits a request signal from the antenna AT (step S2). When the electronic key 50 receives the request signal, the electronic key 50 wirelessly transmits encrypted data. That is, the electronic key 50 stands by in a stand-by mode and repeats transmission of the encrypted data only when it receives the request signal.

When the smart ECU 1 receives the encrypted data from the electronic key 50 (Y in step S3), the smart ECU 1 confirms matching between part of the encrypted data received from the electronic key 50 (the first half in the present embodiment) and part of authorized encrypted data stored in the memory 11a of the smart ECU 11 (step S4). The smart ECU 1 also transmits part of the encrypted data received from the electronic key 50 (the last half in the present embodiment) to the electronic component embedding connector 3 (step S5). The CPU 33a in the electronic component embedding connector 3 confirms matching between the part of the encrypted data received and part of the authorized encrypted data stored in the memory 33c, and transmits a matching result to the smart ECU 1.

In a case in which the smart ECU 1 verifies the matching in step S4 and also verifies the matching based on the matching result received from the CPU 33a in the electronic component embedding connector 3 (Y in step S6), the smart ECU 1 functions as a security canceling unit, cancels security, and transmits permission signals for permission of operations to the door lock driving unit 61, the steering lock driving unit 62, and the engine control unit 63 (step S7). The door lock driving unit 61, the steering lock driving unit 62, and the engine control unit 63 are in states in which operations are permitted when receiving the permission signals. When a door unlocking operation is performed, the door lock driving unit 61 cancels the door lock. When an engine start operation is performed, the steering lock driving unit 62 cancels the steering lock, and the engine control unit 63 performs engine ignition and fuel injection to start the engine.

On the other hand, in a case in which the matching is verified in step S4 but in which the matching is not verified based on the matching result received from the CPU 33a in the electronic component embedding connector 3, in a case in which the matching is verified based on the matching result received from the CPU 33a in the electronic component embedding connector 3 but in which the matching is not verified in step S4, or in a case in which the matching is not verified in step S4 and in which the matching is not verified based on the matching result received from the CPU 33a in the electronic component embedding connector 3 (N in step S6), the smart ECU 1 determines that the electronic key 50 is not authorized and returns to step S1 without canceling the security.

In the case in which no permission signal is output from the smart ECU 1, the door lock driving unit 61 does not cancel the door lock even when the door unlocking operation is performed, and thus no one can intrude into the vehicle in an unauthorized manner. Even when one intrudes into the vehicle in the unauthorized manner, e.g., by breaking the window, the steering lock driving unit 62 does not cancel the steering lock, and the engine control unit 63 does not perform the engine ignition and the fuel injection. Accordingly, vehicle theft can be prevented.

According to the aforementioned embodiment, the encrypted data is stored in the electronic component embedding connector 3 connecting to each other the wiring harnesses W1 and W2 connected to the smart ECU 1 and the loads 40. That is, by storing the encrypted data in the electronic component embedding connector 3 integrated into the wiring harnesses W1 and W2, which are attached to the vehicle body and are difficult to be detached since they cannot be detached without detaching other accessories, security canceling by means of part replacement is difficult, which enables security against vehicle theft to be improved.

Second Embodiment

Next, a second embodiment will be described. A significantly different point of the second embodiment from the first embodiment is a configuration of the electronic component embedding connector 3. While the CPU 33a embedded in the electronic component embedding connector 3 is operated when supply from the power supply IC 33b is received in the first embodiment, the electronic component embedding connector 3 further includes a not-illustrated backup power supply which starts supply of power when supply of power from the power supply IC 33b is interrupted in the second embodiment.

Also, the CPU 33a functions as an attaching/detaching detecting unit and detects attaching and detaching of the smart ECU 1. When the smart ECU 1 is detached, no power is supplied to the power supply IC 33b, and supply of power from the power supply IC 33b is interrupted. When the supply of power from the power supply IC 33b is interrupted, the backup power supply supplies power to the CPU 33a, and the CPU 33a can continue operations. When the CPU 33a determines that the supply of power from the power supply IC 33b is interrupted and that the CPU 33a is supplied with power from the backup power supply, the CPU 33a determines that the smart ECU 1 has been detached and records the matter in the memory 11a. In the case in which the record of the matter that the smart ECU 1 has been detached exists, the CPU 33a in the electronic component embedding connector 3 transmits a matching result of no matching to the smart ECU 1 without verifying matching with encrypted data stored in the memory 33c even when encrypted data is transmitted from the smart ECU 1. Accordingly, once the CPU 33a in the electronic component embedding connector 3 detects that the smart ECU 1 has been detached, the smart ECU 1 does not perform security canceling thereafter.

When one wishes to detach the smart ECU 1 in an authorized manner, one makes the detached smart ECU 1 perform an operation of recording that the smart ECU 1 has been detached in the authorized manner. At this time, in the case in which the information that the smart ECU 1 has been detached in the authorized manner is recorded in the smart ECU 1, the CPU 33a in the electronic component embedding connector 3 confirms matching of encrypted data in a normal manner and outputs the result to the smart ECU 1 even in a case in which the record of the matter that the smart ECU 1 has been detached exists in the memory 33c.

Another idea is that an operation of deleting the record that the smart ECU 1 has been detached stored in the memory 33c in the electronic component embedding connector 3 is made to be performed. Still another idea is sending a command of temporarily stopping detection of attaching and detaching by the CPU 33a before detaching the smart ECU 1, or detaching the backup power supply beforehand to prevent the record that the smart ECU 1 has been detached from being performed.

Accordingly, the security canceling cannot be performed when detaching of the smart ECU 1 is not performed in a correct procedure, and when the smart ECU 1 is detached for an unauthorized purpose. Thus, security against vehicle theft can further be improved.

Meanwhile, although encrypted data is stored in one electronic component embedding connector 3 in the aforementioned first and second embodiments, the present invention is not limited to this. In a case in which the smart ECU 1 is connected to a plurality of electronic component embedding connectors 3, encrypted data may be stored in memories of the plurality of electronic component embedding connectors 3 respectively.

Also, although the CPU 33a of the electronic component embedding connector 3 just confirms matching, and the smart ECU 1 as the security canceling unit performs determination of security canceling based on a matching result received from the electronic component embedding connector 3 in the aforementioned first and second embodiments, the present invention is not limited to this. Conversely, the smart ECU 1 may transmit a matching result to the electronic component embedding connector 3, and the CPU 33a of the electronic component embedding connector 3 may perform determination of security canceling and transmit the determination result to the smart ECU 1 again. In this case, the CPU 33a of the electronic component embedding connector 3 functions as the security canceling unit.

Also, the smart ECU 1 may transmit a matching result with encrypted data recorded in the own memory 11a and a matching result received from the CPU 33a in the electronic component embedding connector 3 to the door lock driving unit 61, the steering lock driving unit 62, and the engine control unit 63, and the door lock driving unit 61, the steering lock driving unit 62, and the engine control unit 63 themselves may determine security canceling. In this case, the door lock driving unit 61, the steering lock driving unit 62, and the engine control unit 63 function as the security canceling unit.

Also, although the door lock driving unit 61, the steering lock driving unit 62, and the engine control unit are connected directly to the smart ECU 1 in the aforementioned embodiments, the present invention is not limited to this. The door lock driving unit 61, the steering lock driving unit 62, and the engine control unit 63 may be connected to the smart ECU 1 via the electronic component embedding connector 3. In this case, the door lock driving unit 61, the steering lock driving unit 62, and the engine control unit 63 correspond to a first in-vehicle unit and a second in-vehicle unit in the claims.

Also, although the door lock canceling, the steering lock canceling, and the engine start permission are performed when both matching with encrypted data stored in the memory 11a of the smart ECU 1 and matching with encrypted data stored in the memory 33c of the electronic component embedding connector 3 are verified in the aforementioned embodiments, the present invention is not limited to this. For example, when the matching with encrypted data stored in the memory 11a of the smart ECU 1 is verified, the door lock canceling may be performed first, and when both the matching with encrypted data stored in the memory 11a of the smart ECU 1 and the matching with encrypted data stored in the memory 33c of the electronic component embedding connector 3 are verified, the steering lock canceling and the engine start permission may then be performed.

Also, although encrypted data is separated and stored in the memories 11a and 33c in the smart ECU 1 and electronic component embedding connector 3 in the aforementioned first and second embodiments, the present invention is not limited to this. The whole authorized encrypted data may be stored in the memories 11a and 33c in the smart ECU 1 and electronic component embedding connector 3.

Also, the aforementioned embodiments are illustrative only, and the present invention is not limited to the embodiments. That is, the present invention can be carried out in various forms without departing from the scope of the present invention.

REFERENCE SIGNS LIST

1 Smart ECU (control unit, security canceling unit)
3 Electronic component embedding connector (connector)
10 Electronic key system
11a Memory
33a CPU (attaching/detaching detecting unit)
33c Memory
50 Electronic key
61 Door lock driving unit (first in-vehicle unit)
62 Steering lock driving unit (first in-vehicle unit)
63 Engine control unit (first in-vehicle unit)
W1 First wiring harness
W2 Second wiring harness

The invention claimed is:

1. An electronic key system comprising:
a control unit acquiring an identification data from an electronic key, being allowed to operate when the acquired identification data is authorized and security is canceled, and being connected to a first in-vehicle unit;
a first wiring harness connected to the control unit;
a second wiring harness connected to a second in-vehicle unit;
a connector connecting the first wiring harness to the second wiring harness, the control unit and the connector respectively including memories embedded therein prestoring the identification data; and
a security canceling unit canceling security to which a matching result of matching is transmitted when all the identification data stored in the memories embedded in the control unit and the connector correspond to the identification data transmitted from the electronic key,
wherein the connector includes an attaching/detaching detecting unit embedded therein and detecting attaching and detaching of the control unit,
wherein when detaching of the control unit in the attaching/detaching detecting unit is detected as a detecting result, the detecting result is stored into the connector, and
wherein after the detecting result is stored in the connector, a matching result of no matching is transmitted to the security canceling unit without verifying matching with the identification data upon transmission of the identification data from the control unit to the connector, the security canceling unit avoids canceling security.

2. The electronic key system according to claim 1, wherein the attaching/detaching detecting unit includes a backup power supply, wherein the attaching/detaching detecting unit is supplied with power from the control unit via the first wiring harness connected to the control unit, and wherein when the control unit is detached from the connector, the attaching/detaching detecting unit is supplied with power from the backup power supply, and the attaching/detaching detecting unit thereby detects as the detecting result the power being supplied from the backup power supply.

* * * * *